(12) United States Patent
Hundscheidt et al.

(10) Patent No.: US 7,283,513 B2
(45) Date of Patent: Oct. 16, 2007

(54) CALL CONTROL NETWORK, ACCESS CONTROL SERVER AND CALL CONTROL METHOD

(75) Inventors: Frank Hundscheidt, Kerkrade (NL); Heino Hameleers, Kerkrade (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1112 days.

(21) Appl. No.: 10/296,565

(22) PCT Filed: May 21, 2001

(86) PCT No.: PCT/EP01/05828

§ 371 (c)(1),
(2), (4) Date: Nov. 22, 2002

(87) PCT Pub. No.: WO01/93606

PCT Pub. Date: Dec. 6, 2001

(65) Prior Publication Data

US 2003/0128694 A1    Jul. 10, 2003

(30) Foreign Application Priority Data

Jun. 2, 2000    (EP)    ................................ 00112029

(51) Int. Cl.
*H04L 12/66*    (2006.01)
(52) U.S. Cl. ...................... 370/352; 370/354
(58) Field of Classification Search ................ 370/352, 370/354, 466, 353
See application file for complete search history.

(56) References Cited

U.S. PATENT DOCUMENTS

| | | | |
|---|---|---|---|
| 5,751,706 A | | 5/1998 | Land et al. |
| 6,940,847 B1* | | 9/2005 | Glitho et al. ................ 370/352 |
| 2001/0055298 A1* | | 12/2001 | Baker et al. ................ 370/352 |

FOREIGN PATENT DOCUMENTS

| | | |
|---|---|---|
| EP | 0 544 447 | 6/1993 |
| WO | WO97/16007 | 5/1997 |
| WO | WO97/23078 | 6/1997 |
| WO | WO97/28628 | 8/1997 |
| WO | WO99/16266 | 4/1999 |

* cited by examiner

*Primary Examiner*—Stella Woo
(74) *Attorney, Agent, or Firm*—Roger S. Burleigh (57) ABSTRACT

The mobile communication network (30) comprises at least one circuit switching access network (33) that supports circuit switched communications. A call control system (23) for providing call related functions for packet switched communications, arranged to send and receive call control information in accordance with a first call control protocol (SIP) for packet switched communication, is provided. An access control system (22) is arranged to exchange call control information with said call control system (23) by using said first call control protocol (SIP), and to exchange call control information with said circuit switching access network (33) by using a second call control protocol (RANAP/BSSAP).

16 Claims, 4 Drawing Sheets

CALL CONTROL NETWORK, ACCESS CONTROL SERVER AND CALL CONTROL METHOD

FIELD OF THE INVENTION

The present invention relates to a call control network for providing call related functions to communications to and from a mobile communication network comprising a plurality of access networks. The present invention also relates to an access control server in such a call control network, and to a call control method.

BACKGROUND OF THE INVENTION

Figure 2:
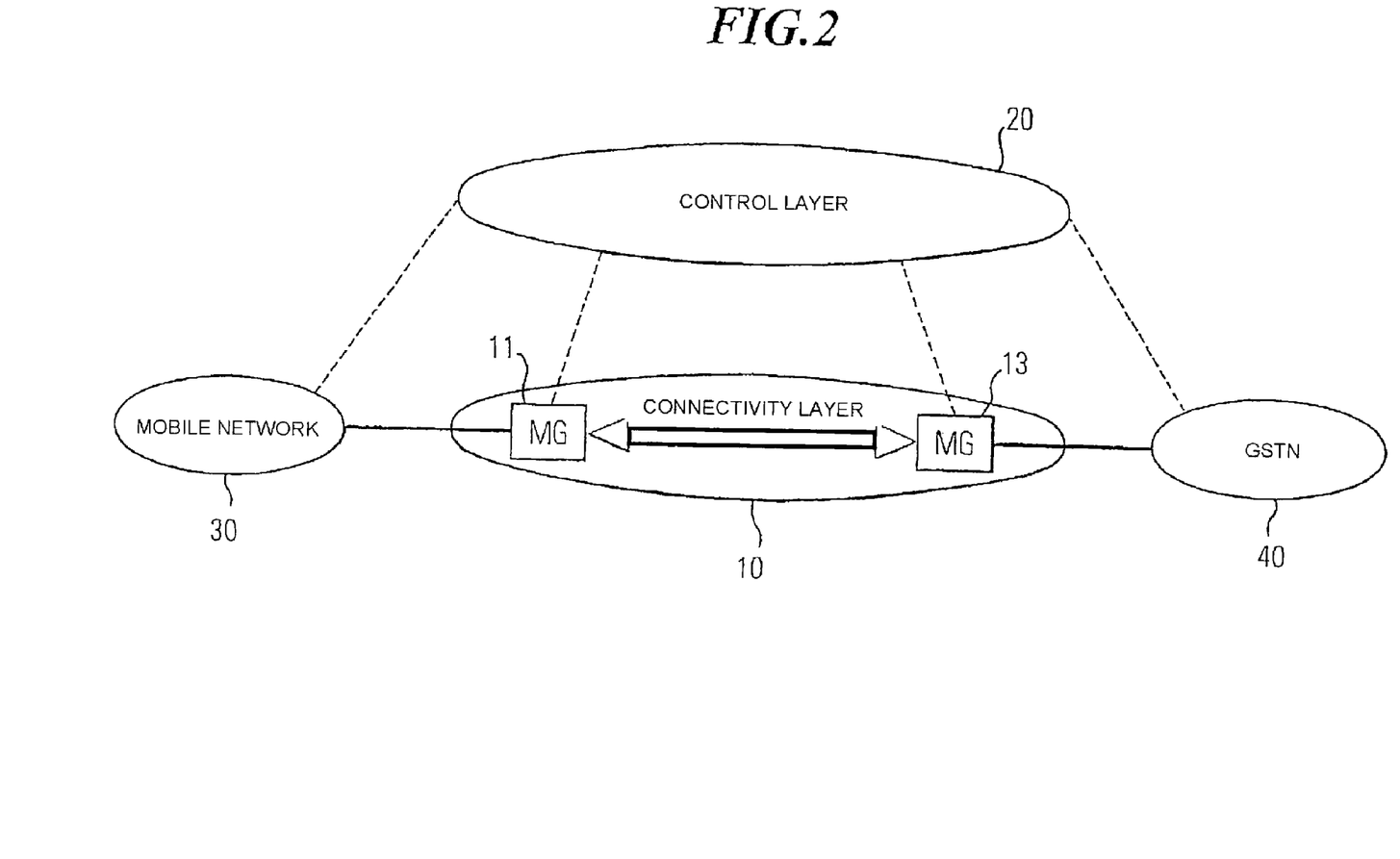
FIG. 2 shows the schematic structure of a connectivity layer and a control layer.

FIG. 2 shows a schematic structure of a system for interconnecting to communication networks 30 and 40. The interconnection is handled by a connectivity layer 10 and a control layer 20. The connectivity layer 10 has so-called media gateways (MG) 11 and 13 that handle the transport of call content or payload for calls between the communication networks 30 and 40. The media gateways 11 and 13 in the connectivity layer 10 handle data on the basis of an appropriate transport scheme, which can be STM based (Synchronous Transfer Mode), ATM based (Asynchronous Transfer Mode) or IP based (Internet Protocol), to name a few examples. The control layer 20 provides call related functions such as actual call control functions (e.g. session management, billing, etc.), as well as network service functions (e.g. intelligent network services) and other network application functions.

Traditionally, communications in telephone networks are circuit switched. Circuit switching is a technique in which a call connection between two terminating equipments corresponds to the allocation of a prescribed set of physical facilities that provide a transmission path of a certain bandwidth or transmission capacity. These facilities are dedicated to the users (terminating equipments) for the duration of the call. The concept of circuit switching is well known in the art and needs not be described in further detail.

Traditional mobile communication systems (such as GSM) also employ circuit switching. However, in recent years developments have been undertaken to introduce so-called packet switching for communication networks, especially for mobile communication networks. Packet switching means that the communication system transports information among users by transmitting sequences of packets each comprising part of the information. If the information does not fit into a single packet, the sending terminal equipment partitions the information into a sequence of packets, the sequence is transported across the network and the receiving terminal equipment reassembles the packets into messages.

The advantage of packet switching over circuit switching is that physical facilities do not need to be dedicated for the users of a given communication for the duration of that communication, such that a more efficient use of the network is enabled. Namely, in circuit switching the physical facilities (e.g. a predetermined amount of bandwidth on a trunk) are reserved for the specific circuit switched connection, even if the users of the associated communication are not exchanging information. In packet switched communication, transmission facilities are only used on demand, i.e. if there is information to be transported. As bandwidth is a very important resource in mobile communication systems, the more efficient use of bandwidth by using packet switching is of great importance.

Consequently, the future mobile communication systems will employ packet switching. An example of this is the General Packet Radio Service (GPRS).

A problem with the new development of mobile communication systems is the compatibility with circuit switched techniques. Namely, it is desirable that a given mobile communication system supports both circuit switched communications and packet switched communications. This effectively means that a mobile communication system comprises a plurality of so-called access networks, where some of these access networks are based on packet switching and others on circuit switching. This, however, leads to a complicated structure of the call control layer, because calls to and from mobile stations operating in the various access networks must be appropriately handled.

Object of the Present Invention

The object of the present invention is to provide an efficient call control network for controlling calls in a mobile communication network, where said mobile communication network comprises at least one circuit switching access network and at least one packet switching access network.

SUMMARY OF THE INVENTION

This object is solved by the subject-matter described in the independent claims 1, 6 and 10. Advantageous embodiments are described in the dependent claims 2 to 5 and 7 to 9.

According to the present invention an access control system and an access control server for circuit switched communications are provided, providing an interworking function between circuit switching access networks on the one hand and a call control system or call control function on the other hand, where said call control system is arranged to provide call related functions for packet switched communications. This is done by letting the access control system or server communicate with the call control system on the basis of a call control protocol for controlling packet switched communications, where the access control server terminates said protocol. On the other hand, the access control system or access control server communicates with the circuit switching access network with a second call control protocol for controlling circuit switched communications.

In this way, it is possible to apply call related functions provided by the call control system, which is arranged to provide such functions to packet switched communications, to circuit switched communications as well. It is therefore not necessary to provide two parallel control systems, one for circuit switched communications and one for packet switched communications, where these two parallel call control systems would provide overlapping functionalities. Much rather, in accordance with the present invention, it is possible to make optimum use of a (central) call control system.

Preferably, the access control system or access control server for handling call control related signalling associated with circuit switched communications by itself generates and provides predetermined call related functions for such circuit switched communications. In other words, certain call related functions are provided by the call control system and others by the circuit switched access control system. Preferably, the call related functions provided by the circuit switched access control system are access specific functions associated with circuit switched communications.

The present invention will become more readily understandable from the following detailed description of preferred embodiments, which are only given as illustrative examples and are not intended to restrict the scope of the invention, where the description makes reference to the accompanying figures, in which.

DETAILED DESCRIPTION OF THE PRESENT INVENTION

Figure 1:
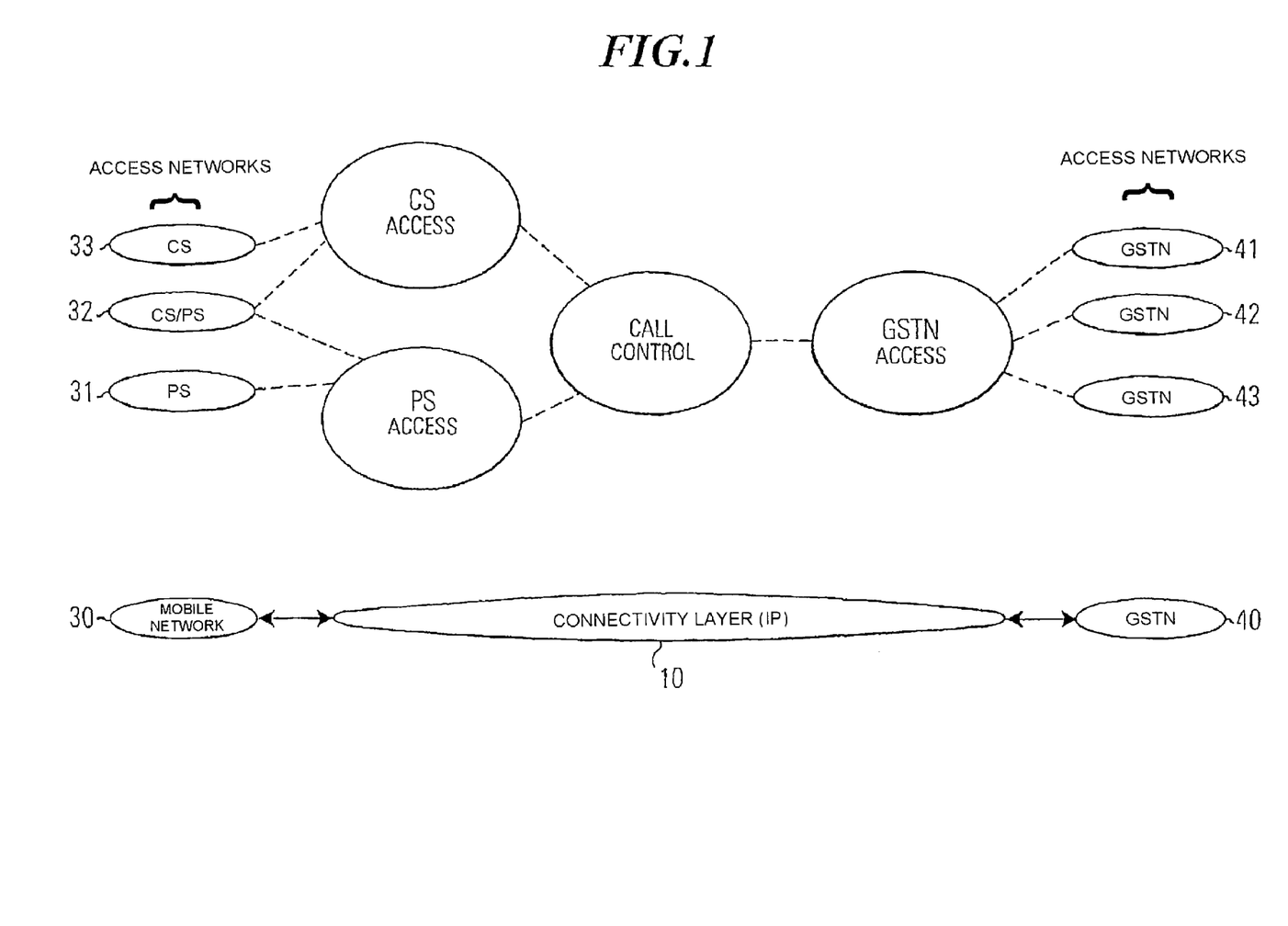
FIG. 1 shows a schematic overview of a call control network arranged in accordance with the present invention.

FIG. 1 shows a schematic overview of a call control network according to the present invention. A mobile communication network 30 and a general switched telephone network GSTN 40 are shown, connected by a connectivity layer 10. Preferably, the connectivity layer 10 is IP based.

The mobile communication network 30 comprises a plurality of access networks 31, 32 and 33, where access network 31 is packet switched, access network 33 is circuit switched, and access network 32 supports both packet switching and circuit switching. This is naturally only an example, and more or less access networks could be provided. The call control layer comprises a circuit switched (CS) access system 22 and a packet switched (PS) access system 21, where the packet switched access control system 21 handles call control related signalling associated with the packet switched access networks, and the circuit switched access control system 22 handles call control related signalling associated with circuit switched communications. It may be noted that dotted lines in FIG. 1 indicate signalling, whereas solid lines indicate content or payload.

The call control network furthermore comprises a call control system 23 for providing call related functions for packet switched communication. FIG. 1 additionally shows a GSTN access control system 24 that handles call control related signalling associated with a plurality of GSTN access network 41-43 that belong to GSTN 40.

In accordance with the present invention, the circuit switching access control system 22 communicates with the call control system (sometimes also referred to as call control domain) 23 on the basis of a call control protocol for controlling packet switched communication, where said protocol is terminated by the circuit switching access control system 22. The call control system 23 uses the same protocol to interact with the packet switching access control system 21. Therefore, by arranging the communication between the CS access control system 22 and the call control system 23 in this way, the CS access control system 22 can "act" like a PS access control system towards the call control system 23. In other words, from the point of view of the call control system 23, only packet switched communications are dealt with, such that the call control system does not need any circuit switching specific control functions. All necessary circuit switching specific functions are implemented in the CS access control system 22, which on the other hand however preferably does not duplicate any functions provided by the call control system 23. In other words, a highly efficient and simplified structure is presented.

The CS access control system 22 communicates with the circuit switching access network 33 with the help of a second call control protocol designed for control of circuit switched communications, where this second call control protocol is also terminated by the CS access control system 22. The CS access control system interworks between the circuit switching access network 33 and the call control system 23, in such a way that at least a part of the call related functions provided by the call control system 23 can also be applied to circuit switched communications to and from the circuit switching access network 33.

It may be noted that the term "interworking" can consist in a simple repackaging or reframing of information sent in accordance with one protocol into protocol data units (PDU) of the other protocol. The interworking can also be more complicated and comprise a manipulation of such information before sending it from the access network 33 to the call control system 23 or vice versa. It should be noted that the precise details of such manipulation are outside the scope of the present invention, as such manipulation will depend on the standard or standards used in the access network 33 and the call control system 23. In this way, such manipulation will be implemented as desired for a specific application.

As a consequence of the above-described arrangement, the access network 33 is presented with a complete call control functionality for circuit switched connections, even though in reality at least some of these functions are provided by the call control system 23 that is arranged for providing call related functions to packet switched communications. The call control system 23 in turn is not aware that it is providing such functions to circuit switched communications, as the CS access control system 22 communicates like a packet switching access control system.

Besides providing the function of interworking between the circuit switching access network 33 and the call control system 23, the CS access control system 22 will preferably also itself generate and provide predetermined call related functions that are specific for the circuit switched communications. Namely, any necessary or desired call-related functions not supported by the call control protocol used between CS access control system 22 and the call control system 23 will be provided by the CS access control system 22 itself. These additional functions will typically be access specific functions, especially radio resource management and mobility handling. Examples of radio resource specific features that can be implemented by the CS access control system 22 are the handling of high-speed circuit-switched data (HCSD) or an enhanced multi-level precedence and pre-emption service. Examples of mobility management specific features are regional services or the support of localized service area.

Now a more detailed example shall be described in connection with FIG. 3. The same reference numerals as in FIGS. 1 and 2 refer to the same or equivalent features in FIG. 3. Solid lines again refer to content or payload, while dotted lines refer to signalling.

Reference numeral 300 refers e.g. to a radio network controller (RNC) of a UMTS system or a base station controller (BSC) of a GSM system. Media gateways 11 and 13 are provided, for transporting user information between the RNC 300 and a general switched telephone network (GSTN) 400.

Figure 3:
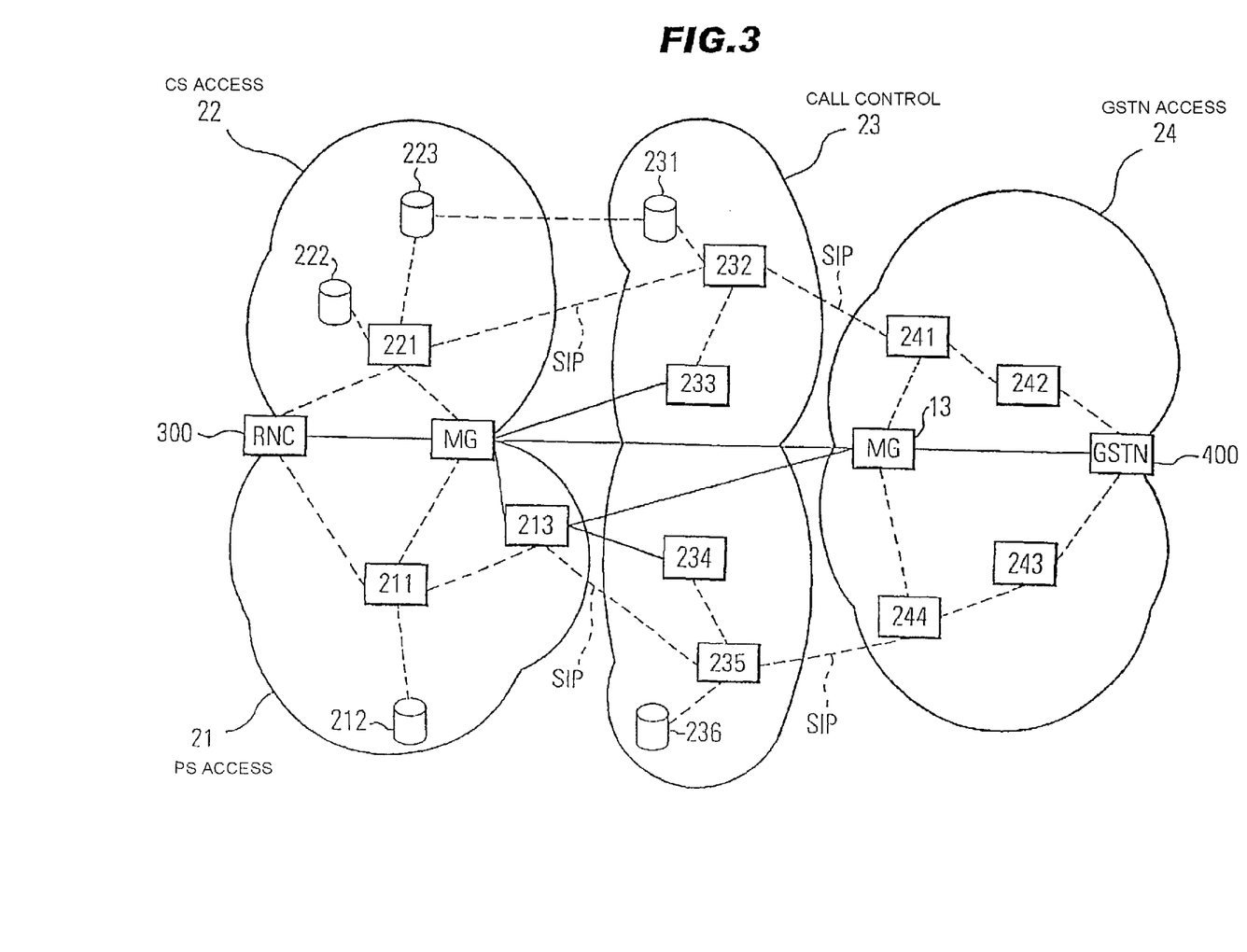
FIG. 3 shows a detailed embodiment of the present invention.

In the example of FIG. 3, it will be assumed that the packet switched communications conform to GPRS (General Packet Radio Service), which is well known and therefore needs not to be described in detail. The circuit switched communications are assumed to conform to standard GSM.

The access control system (or access control domain) for handling call control related signalling associated with packet switched communications comprises an SGSN server (serving GPRS support node server), a home location register (HLR) 212 and a GGSN (Gateway GPRS support node)

213. It may be noted that in the present example the SGSN is split into the SGSN server performing all call control functionality and a media gateway for payload transmission. Naturally, the invention is not restricted to such a configuration, as any suitable or desirable configuration my be chosen. The SGSN server 211 controls packet switched communications of the media gateway 11, where the SGSN server 211 communicates with the MG 11 via a connection in accordance with e.g. the ITU-T standard H.248. The HLR 212 stores subscriber related data that allows the SGSN server to among other things perform mobility handling of GPRS subscribers.

The access control system 22 for handling call control related signalling associated with circuit switched communications comprises an access control server 221, which will also be referred to as a radio access network gateway or radio access network media gateway controller (RAN MGC). The RAN MGC 221 comprises a visitor location register (VLR), and the CS access control system 22 also comprises an HLR 223. The VLR 222 and HLR 223 correspond to the registers of equal name well known from GSM. The RAN MGC controls communications via the media gateway 11, e.g. also by signalling to the MG 11 with the help of H.248.

The call control system or call control domain 23 comprises call state control functions (CSCF) 232 and 235, media resource functions (MRF) 233 and 234, user mobility system/home subscriber systems (UMS/HSS) 231 and 236, which among other things comprise a database for authentication, authorization, accounting. It may be noted that in the example of FIG. 3, the call control system 23 is a multimedia call control domain, which means that the media resource functions 233, 234 can process the media streams of calls, in order to provide conference calls to subscribers.

The GSTN access control system 24 comprises GSTN media gateway controllers 241, 244 for controlling media gateway 13, and signalling gateways (SG) 242, 243 for communicating signalling to the GSTN 400.

As can be seen, a common call control system or call control domain is provided for both packet switched based multimedia (GPRS) terminals and circuit switched terminals, which communicate with the call control network via the radio network controller 300. It may be noted that the described call control architecture is naturally not only suitable for terminals that are fully circuit switched or fully packet switched, but can also be applied for such terminals that can employ both circuit switching and packet switching. There are e.g. also terminals that employ circuit switching for voice communications and packet switching for multimedia communications.

The multimedia terminals connect to the call control domain 23 via the GPRS access control system 21, where the GPRS access control system 21 forwards the call control signalling from the terminals transparently to the call control domain 23. The communication between the user equipment and the CSCF 235 occurs on the basis of the session initiation protocol (SIP), which is e.g. described in IETF RfC No. 2543, or on the basis of any other suitable IP based protocol. The CSCF 235 can therefore be considered as being a SIP server or SIP proxy.

The circuit switched terminals connect to the call control domain 23 via the CS access control system 22. The RAN MGC terminates the CS call control signalling protocols and converts them into an IP based call control protocol (e.g. SIP). For example, the communication between the RNC 300 and the RAN MGC 221 can be conducted in accordance with BSSMAP/RANAP (Base Station System Application Part/Radio Access Network Application Part).

Figure 4:
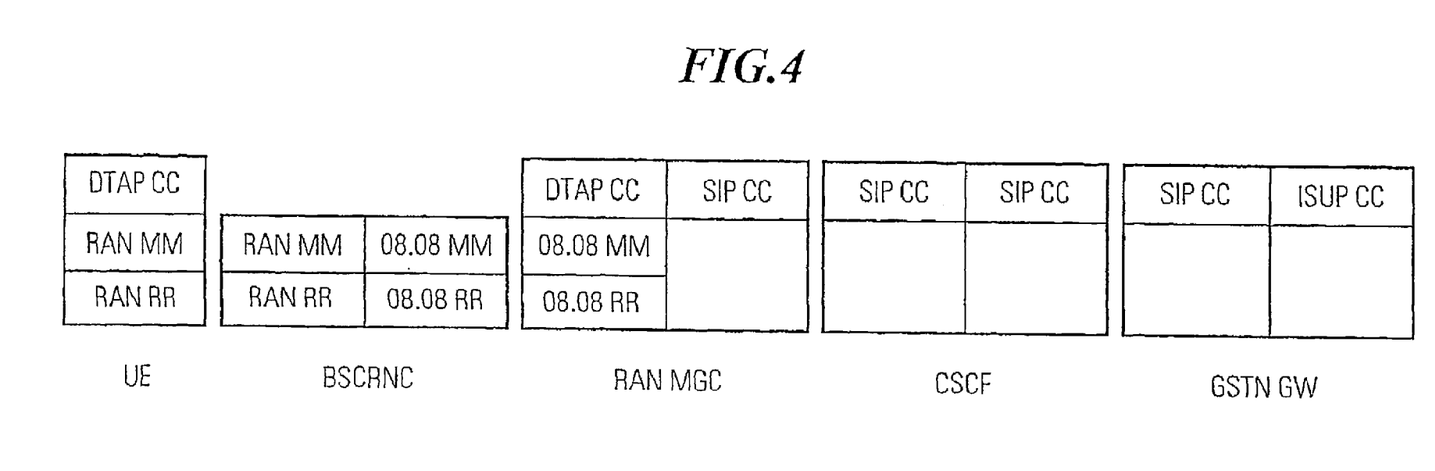
FIG. 4 shows an example of protocol layering.

FIG. 4 shows an example of a protocol structure that can be used in the context of the present invention. As can be seen, the mobility management layer and radio resource layer are terminated at the user equipment (UE) and the radio access network gateway (RAN GW) or RAN MGC, where the BSC/RNC (Base Station Controller/Radio Network Controller) can translate these mobility management and radio resource protocols. Also, the protocol above the MM/RR layers used by the user equipment (e.g. direct transfer application protocol DTAP) is terminated at the RAN GW. The RAN GW translates the DTAP call control into SIP call control.

As already shown in FIG. 3, the call control protocol between the CSCF 232 and the GSTN MGC 241 is also SIP, which is indicated in FIG. 4, and finally the GSTN gateway translates the SIP call control into ISUP call control (ISDN user part), for example.

Due to the above arrangement, the RAN MGC communicates in BSSMAP/RANAP to the RNC/BSC, it communicates in DTAP to the UE, and in SIP to the CSCF. It therefore appears like a MSC (mobile switching centre) towards the RNC/BSC and the UE. On the other hand, it appears like a GGSN/UE towards the CSCF.

The implementation of functions in the RAN MGC is preferably such that RR/MM layer dependent features are implemented in the RAN MGC, whereas RR/MM layer independent features (which are supported by SIP) are implemented in the CSCF. RR/MM dependent features, i.e. features specific to radio resource management and mobility handling have been mentioned above, and examples of RR/MM independent features are session/connection monitoring, billing, intelligent network services (such as call waiting, call forwarding, call interception, etc.) and general network application functions.

By virtue of this arrangement, the circuit switched terminal or UE will see a mobile switching centre (MSC) as it is well known for present GSM systems, and the multimedia call control domain 23 will see a GGSN and UE, as if the circuit switched user equipment were a packet switching multimedia terminal accessing the call control domain via a packet switching access control system.

The detailed implementation of the RAN MGC not only depends on the specific standards employed in the access networks and call control system, but also on desired support functionalities. Such desired functionalities can be chosen and implemented as desired or required for specific applications. In the following, a number of simple examples shall be given for the purpose of illustration.

In a first example, the system will be arranged such that all multimedia communications are packet switched, and the circuit switched support only extends to voice services. An example of such a situation would be a network operator who only has GPRS (packet switched) home subscribers, but wishes to at least provide voice service for roaming subscribers that use circuit switching equipment. For voice services the (outband) call control signalling from the mobile station is terminated in the RAN MGC. The RAN MGC converts the DTAP control signalling to SIP control signalling towards the CSCF. The CSCF processes the call signalling. The calling party number is carried in the DTAP control signalling. The payload may be converted to the RTP (Real Time Protocol) format in the RAN MGC, depending on the format supported by the RNC.

With respect to service subscription handling, i.e. the providing of supplementary services such as intelligent network services, which reside in the multimedia call control domain, a number of options are available for the specific handling of associated service interrogation requests. For example, upon interrogation from the mobile station, the RAN MGC may interrogate the UMS/HSS server in the multimedia call control domain. Or, upon interrogation from the mobile station, the RAN MGC may interrogate the HLR. The HLR interrogates the UMS/HSS server and returns the result to the RAN MGC (note the signalling connection between HLR 223 and UMS/HSS 231 in FIG. 3). When new services are administered, both the HLR and the UMS/HSS server are updated.

For mobility handling, the RAN MGC allocates an appropriate packet switching address, such as an IP address for the circuit switched subscriber, where the CSCF keeps track of this IP address with the help of the user mobility system (UMS) database, such that the circuit switched subscriber can be treated like a packet switched subscriber. The CSCF only needs to be updated when the IP address at which the subscriber can be found is changed. On the other hand, the RAN MGC keeps track of the location area of a subscriber, i.e. the subscriber's actual location in the access network.

Although the present invention has been described on the basis of a number of specific examples, these only serve to better illustrate the invention, and are not intended to restrict the scope. Reference numerals in the claims also serve the purpose of better understanding, and are not intended to restrict the scope.

The invention claimed is:

1. A call control network for controlling calls in a mobile communication network, said mobile communication network comprising at least one circuit switching access network that supports circuit switched communications and at least one packet switching access network that supports packet switched communications, comprising
   a call control system for providing call control related functions for packet switched communications, arranged to send and receive call control information in accordance with a first call control protocol for packet switched communication,
   a first access control system for handling call control related signalling associated with packet switched communications to and from mobile stations in said mobile communication network, and
   a second access control system for handling call control related signalling associated with circuit switched communications to and from mobile stations in said mobile communication network, wherein said second access control system is arranged to exchange call control information with said call control system by using said first call control protocol, where said second access control system terminates said first call control protocol, and wherein said second access control system is arranged to exchange call control information with said circuit switching access network by using a second call control protocol for circuit switched communication, where said second access control system terminates said second call control protocol, and said second access control system having interworking functions, such that at least a part of said call related functions provided by said call control system can also be applied to circuit switched communications.

2. A call control network according to claim 1, wherein said call related functions comprise one or more of call control functions, network service functions and network application functions.

3. A call control network according to claim 1 wherein said second access control system generates and provides predetermined call related functions for circuit switched communications.

4. A call control network according to claim 3, wherein said predetermined call related functions are access specific functions for circuit switched communications.

5. The call control network recited in claim 1, wherein said first access control system comprises a serving GPRS support node (GSGN).

6. The call control network recited in claim 5, wherein said first access control system further comprises a gateway GPRS support node (GGSN).

7. The call control network recited in claim 1, wherein said call control system comprises a call state control function (CSCF) node.

8. The call control network recited in claim 1, wherein said call control system comprises a media resource function (MRF) node.

9. An access control server for handling call control related signalling associated with circuit switched communications to and from mobile stations in a mobile communication network, said mobile communication network associated with at least one circuit switching access network that supports circuit switched communications, wherein said access control server is arranged to be connected to a call control system for providing call related functions for packet switched communications, said call control system being arranged to send and receive call control information in accordance with a first call control protocol for packet switched communication, wherein said access control server comprising: a first interface for exchanging call control information with said call control system by using said first call control protocol, where said access control server terminates said first call control protocol, and wherein said access control server is furthermore arranged to be connected to said circuit switching access network using a second interface for exchanging said call control information with said circuit switching access network by using a second call control protocol for circuit switched communication, where said access control server terminates said second call control protocol and has interworking functions, such that at least a part of said call related functions provided by said call control system can also be applied to circuit switched communications.

10. A access control server according to claim 9 wherein said call related functions comprise one or more of call control functions, network service functions and network application functions.

11. An access control server according to claim 9 further generating and providing predetermined call related functions for circuit switched communications.

12. An access control server according to claim 11, wherein said predetermined call related functions are access specific functions for circuit switched communications.

13. The access control server of claim 9 further exchanging said call information with a call state control function (CSCF) node.

14. The access control server of claim 13 wherein said call control system further comprising a media resource function (MRF) node.

15. A call control method for a mobile communication network, said mobile communication network comprising at least one circuit switching access network that supports circuit switched communications, further comprising the steps of:

providing call related functions for packet switched communications in a call control system that is arranged to send and receive call control information in accordance with a first call control protocol for packet switched communication, handling call control related signalling associated with circuit switched communications to and from mobile stations in said circuit switching access network in an access control system, exchanging call control information between said access control system and said call control system by using said first call control protocol, where said access control system terminates said first call control protocol, exchanging call control information between said access control system and said circuit switching access network by using a second call control protocol for circuit switched communications, where said second access control system terminates said second call control protocol, and providing an interworking function in said access control system, such that at least a part of said call related functions provided by said call control system can also be applied to circuit switched communications.

16. The method of claim 15 wherein said access control system further providing predetermined call related function that is specific for said circuit switching access network.

\* \* \* \* \*

UNITED STATES PATENT AND TRADEMARK OFFICE
CERTIFICATE OF CORRECTION

PATENT NO. : 7,283,513 B2  Page 1 of 1
APPLICATION NO. : 10/296565
DATED : October 16, 2007
INVENTOR(S) : Hundscheidt et al.

It is certified that error appears in the above-identified patent and that said Letters Patent is hereby corrected as shown below:

In Column 2, Lines 25-28, below "SUMMARY OF THE INVENTION" delete "This object is solved..... claims 2 to 5 and 7 to 9.".

In Column 7, Line 36, in Claim 1, after "comprising" insert -- : --.

In Column 8, Line 5, in Claim 4, delete "claim 3." and insert -- claim 3, --, therefor.

In Column 8, Line 47, in Claim 10, delete "A" and insert -- An --, therefor.

Signed and Sealed this

Twenty-second Day of July, 2008

JON W. DUDAS
*Director of the United States Patent and Trademark Office*